(12) United States Patent
Child

(10) Patent No.: US 6,863,199 B2
(45) Date of Patent: Mar. 8, 2005

(54) SNOWBOARD RACK FOR SNOWMOBILES

(76) Inventor: Blake Child, 1914 Jeremy Ct., Salt Lake City, UT (US) 84121

( * ) Notice: Subject to any disclaimer, the term of this patent is extended or adjusted under 35 U.S.C. 154(b) by 63 days.

(21) Appl. No.: 10/314,047

(22) Filed: Dec. 6, 2002

(65) Prior Publication Data

US 2004/0108349 A1 Jun. 10, 2004

(51) Int. Cl.[7] .............................. B60R 9/02; B60R 9/08
(52) U.S. Cl. ....................... 224/408; 224/460; 224/557; 224/563; 224/568; 224/913; 224/917.5
(58) Field of Search ................................ 224/325, 408, 224/460, 531, 534, 537, 555, 557, 563, 568, 571, 913, 917.5; 280/769

(56) References Cited

U.S. PATENT DOCUMENTS

| | | | | |
|---|---|---|---|---|
| 3,039,634 A | * | 6/1962 | Hobson et al. ............. 224/531 |
| 3,701,436 A | * | 10/1972 | Adams ..................... 224/917.5 |
| 3,921,870 A | * | 11/1975 | Camp ......................... 224/408 |
| 4,277,008 A | * | 7/1981 | McCleary ................... 280/769 |
| 4,375,268 A | * | 3/1983 | Speck ........................ 224/571 |
| 4,469,257 A | * | 9/1984 | Parker ..................... 224/917.5 |
| 4,607,772 A | * | 8/1986 | Hancock ...................... 224/913 |
| 5,000,363 A | * | 3/1991 | Linquist .................. 224/917.5 |
| 5,050,785 A | * | 9/1991 | Hays .......................... 224/537 |
| 5,078,309 A | * | 1/1992 | Hull et al. .................. 224/571 |
| 5,390,837 A | | 2/1995 | Ruffolo, Jr. |
| 5,564,683 A | | 10/1996 | Stuck |
| 5,752,638 A | | 5/1998 | Meeks |
| 5,906,304 A | | 5/1999 | Baldacchino |
| 6,019,265 A | | 2/2000 | Deloza |
| 6,142,349 A | * | 11/2000 | Roberson .................... 224/568 |
| 6,189,753 B1 | | 2/2001 | Kalhok et al. |
| 6,196,397 B1 | | 3/2001 | Maher |
| 6,199,734 B1 | * | 3/2001 | Meeks ........................ 224/571 |
| 6,457,619 B1 | * | 10/2002 | Werner et al. ............. 224/531 |
| 6,698,635 B1 | * | 3/2004 | Brown ....................... 224/460 |

* cited by examiner

Primary Examiner—Gary E. Elkins
(74) Attorney, Agent, or Firm—Brent T. Winder; Jones Waldo Holbrook & McDonough

(57) ABSTRACT

A snowboard rack for snowmobiles to aid snowmobile operators in safely carrying and transporting snowboards, as attached to a snowmobile machine for recreation or other purposes. A frame attachment member is secured to an underside, typically the belly pan, of a front portion of a snowmobile, upon which a rack frame is removably attached. The rack frame includes at least two uprights, with a cradle formed into an upper portion of each upright, for secure placement of a snowboard. The snowboard is secured to the rack frame with a tie-down strap at each cradle.

4 Claims, 3 Drawing Sheets

SNOWBOARD RACK FOR SNOWMOBILES

BACKGROUND OF THE INVENTION

1. Field of the Invention

The present invention relates generally to a rack for carrying a snowboard. Specifically, the present invention relates to a snowboard rack, for holding and carrying a snowboard, designed to be mounted to a frame of a snowmobile.

2. Background and Prior Art

The use of various types of equipment racks for carrying skis, wakeboards and snowboards are well known. More particularly, however, an example of a rack designed for carrying a snowboard in connection with operating a snowmobile is absent from the prior art. Commonly, snowboard racks in the prior art are taught to be attached to trucks, cars, or various types of water craft. As a result, the present invention seeks to provide a snowboard rack designed for mounting to a frame of a snowmobile for carrying a snowboard without hindering the snowmobile operator's ability to safely drive the snowmobile, and for securing the snowboard to the snowmobile in a safe manner to withstand various driving styles and conditions.

The following United States patents are herein incorporated by reference for their supporting teachings:

1) U.S. Pat. No. 5,752,638 issued to Meeks discloses a rack for storing one or more pairs of water skis and wake boards including one or more pairs of forks having parallel prongs extending from and coplanar with a base plate section. The pairs of forks are mounted on a support bar extending through an opening in the base plate section and may be positioned axially along and orientationally around the bar then clamped in the selected position such that each fork is aligned with its pair member. A strap is provided for each fork so that a water ski or wakeboard may be nested between neighboring prongs;

2) U.S. Pat. No. 6,019,265 issued to Deloza discloses a snowboard rack for transporting a snowboard in a pickup truck having a cab and a bed. The carrier has a carrier sleeve which extends over a header shaft to allow slidable movement thereupon. The carrier has a pair of cradles which support the snowboard therein, and a strap mechanism which secures the snowboard;

3) U.S. Pat. No. 6,189,753 issued to Kalhok et al. discloses a carrier rack for use primarily on a watercraft. The carrier rack has preferably two resilient, elastomeric cradles adapted to receive an object to be carried. Th cradles are adapted to be mounted on an outside surface of the watercraft, most preferably the gunwales;

4) U.S. Pat. No. 5,906,304 issued to Baldacchino discloses a rack that adjustably attaches to an inboard wall panel of a boat for securing water sport equipment in the cockpit of the boat. The device is configured so that the rack adjustably attaches to the inboard wall panel and secures a variety of equipment such as water skis and wake boards;

5) U.S. Pat. No. 5,390,837 issued to Ruffolo Jr. discloses a snowboard rack which is readily mountable to any roll-up window on an automotive vehicle; and 6) U.S. Pat. No. 5,564,683 issued to Stuck discloses a rotatable apparatus for servicing or repair of snowmobiles, including a frame or rack with a pair of generally parallel curved frame members which are located along a side of the snowmobile.

SUMMARY OF THE INVENTION

The present invention relates to a snowboard rack for snowmobiles to aid snowmobile operators in safely carrying and transporting snowboards, as attached to their snowmobile machines for recreation or other purposes. A principal feature of this invention is to provide a snowboard rack which allows the operator to easily and quickly mount a snowboard thereupon, which facilitates maneuverability and relatively easy mounting and dismounting of the operator from the snowmobile when the same is installed, and which safely and firmly secures a snowboard to the snowmobile during operation of the snowmobile.

Therefore, it is an advantage of the present invention to incorporate the use of a snowboard rack for snowmobiles; wherein, a frame attachment member is secured to an underside, typically the belly pan, of a forward portion of a snowmobile, upon which a rack frame is removably attached. The rack frame includes at least two uprights, with a cradle formed into an upper portion of each upright, for secure placement of a snowboard. The snowboard is secured to the rack frame with a tie-down strap at each cradle.

Additional features and advantages of the invention will be set forth in the detailed description which follows, taken in conjunction with the accompanying drawings, which together illustrate by way of example, the features of the invention.

BRIEF DESCRIPTION OF THE DRAWINGS

In view of these features which will become more readily apparent as the nature of the invention is better understood, the invention consists of the novel combination of parts, hereinafter more fully described with like numbers corresponding to like elements between drawings, illustrated and claimed with reference to the appended figures wherein:

DETAILED DESCRIPTION OF THE ILLUSTRATED EMBODIMENT(S)

Figure 1:
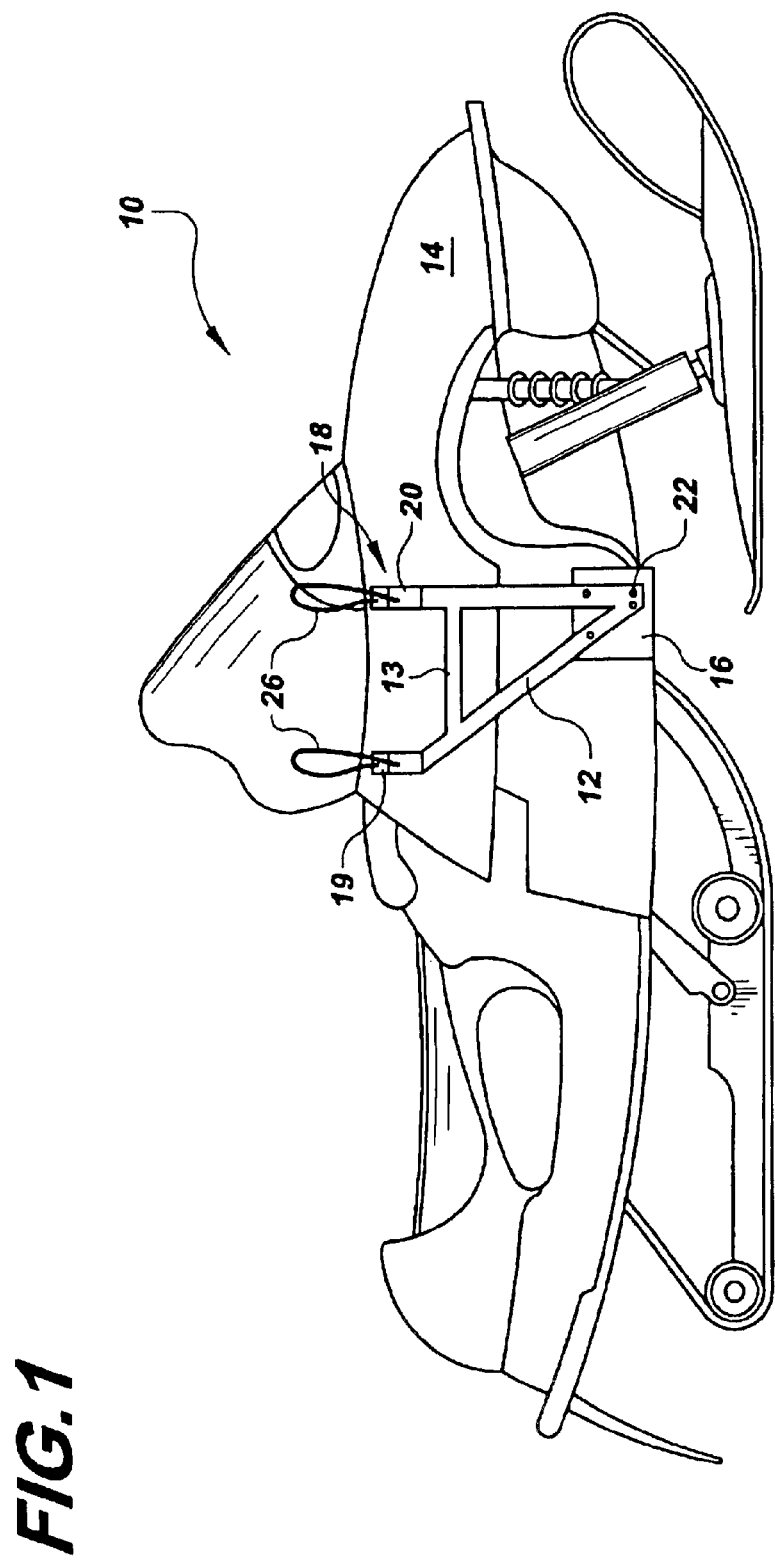
FIG. 1 is a side view of an illustrated embodiment of a snowboard rack for snowmobiles 10 as attached to a typical snowmobile.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The present invention is used in the typical environment in which equipment racks, specifically snowboard racks, are utilized by snowboarders for transporting a snowboard, or snowboards, but where it may be advantageous to provide a snowboard rack that: can be quickly and easily attached to a snowmobile, allows the operator to easily and quickly mount a snowboard thereupon, facilitates maneuverability and relatively easy mounting and dismounting of the operator from the snowmobile when the rack is in use, and which safely and firmly secures a snowboard to the snowmobile during operation of the snowmobile. The advantages over the prior art lie principally in that the present invention provides for the application of a snowboard rack specifically designed for attachment to a snowmobile.

Referring now to FIG. 1, there is shown a side view of an illustrated embodiment of a snowboard rack for snowmobiles 10 (as shown attached to a typical snowmobile 14). Specifically, a rack frame 12, with integral supporting cross-member 13, is attached to a mounting plate 16 via mounting bolts 22. At the top of each frame upright 19, there is integrally attached a cradle arm 20, which upright 19 and cradle arm 20 in tandem form a snowboard cradle 18. Thus, a snowboard (see FIG. 2) may be attached to the cradle 18 with tie-down straps 26, which may be made of a strong and flexible material and attached with conventional attachment means according to one skilled in the art.

Figure 2:
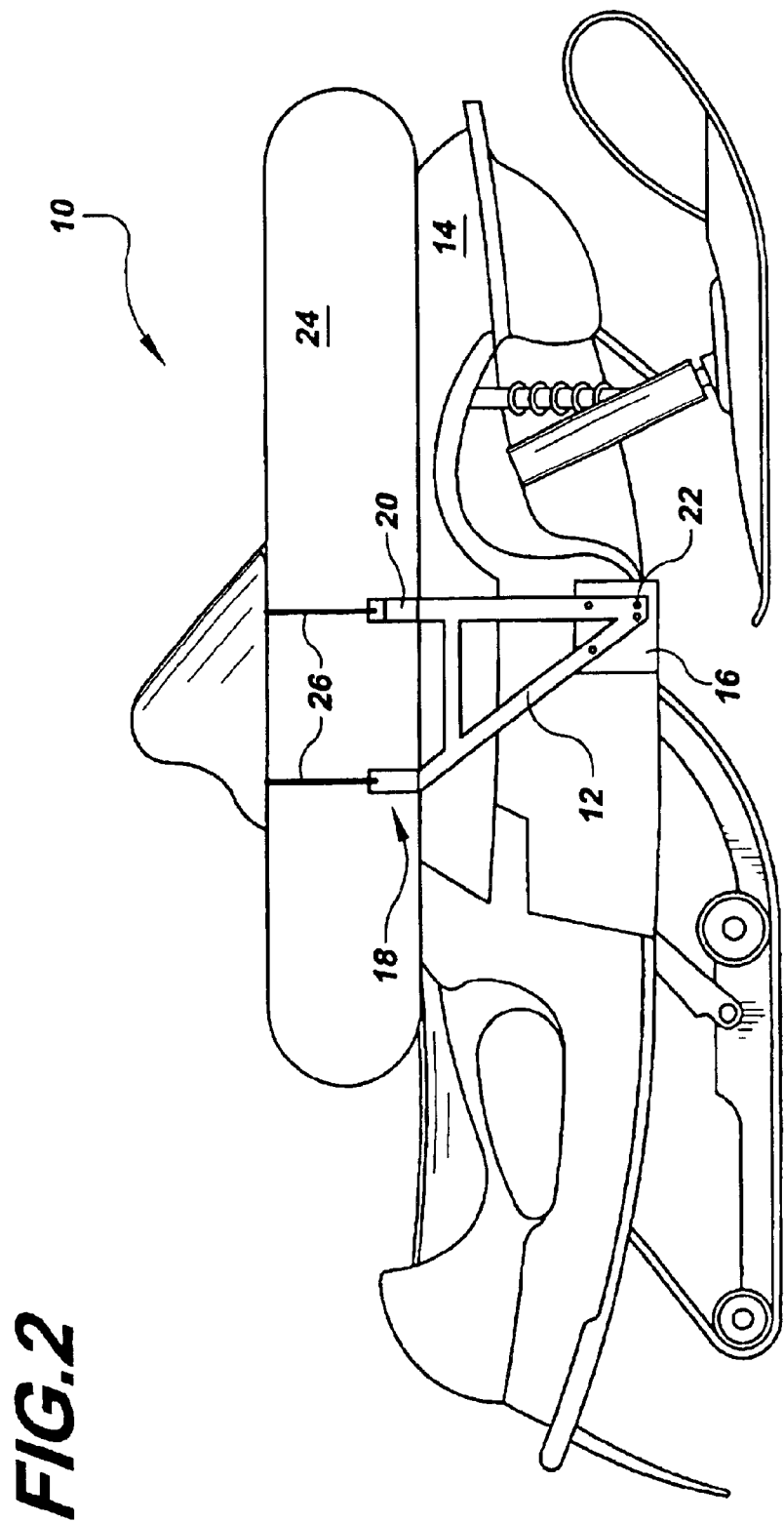
FIG. 2 is a side view of an illustrated embodiment from FIG. 1, carrying a typical snowboard.

Referring now to FIG. 2, which is a side view of an illustrated embodiment from FIG. 1, there is shown a typical snowboard 24 secured within the cradles 18. FIG. 2 also illustrates the tie-down straps 26 in use, as applied over an edge of the snowboard 24 and secured to the cradle arms 20.

Figure 3:
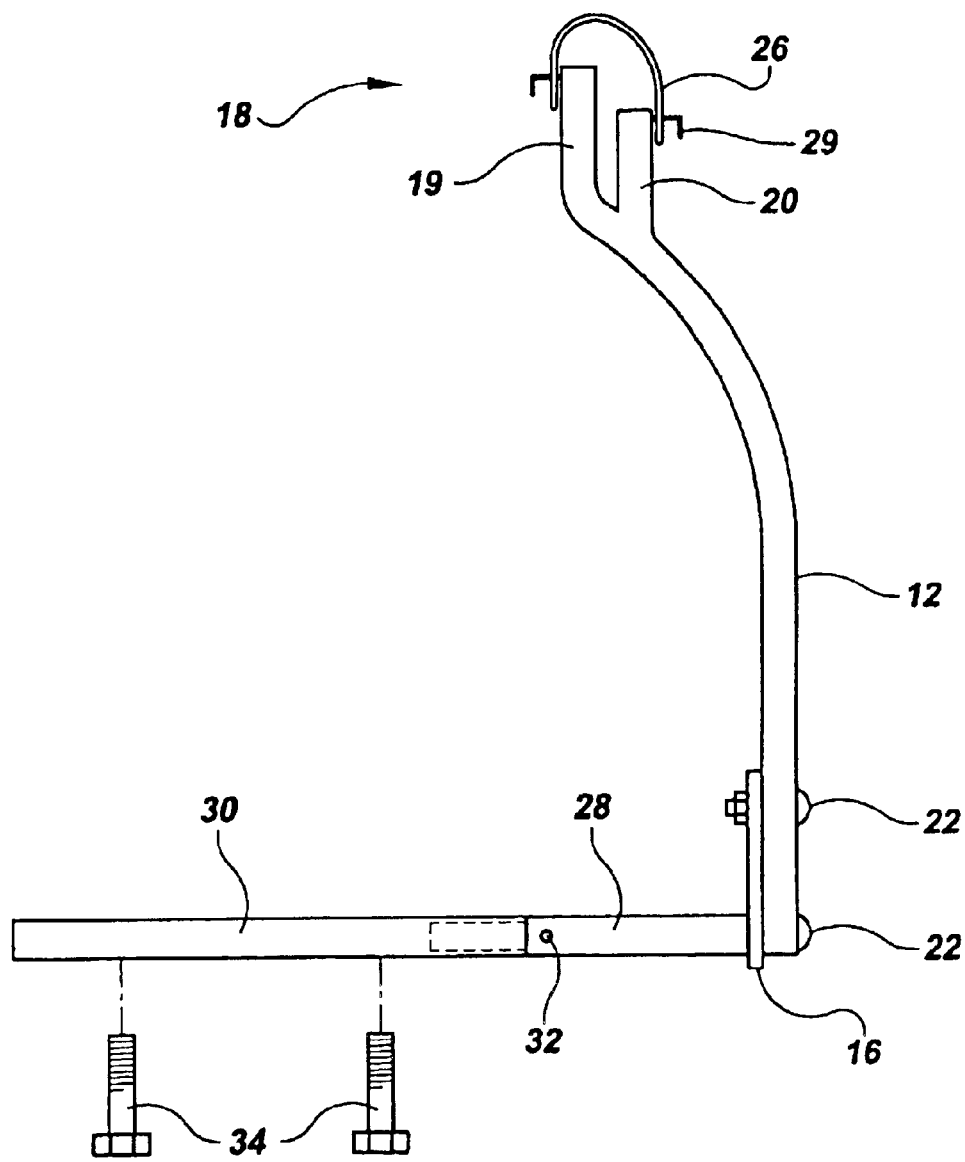
FIG. 3 is a rear view of the snowboard rack for snowmobiles 10 from FIG. 1, as not attached to a snowmobile.

Referring now to FIG. 3, which is a rear view of the snowboard rack for snowmobiles 10 from FIG. 1 (as not shown attached to a snowmobile), there is additionally shown a frame attachment member 30, within which a rack frame coupling 28 may be inserted and pinned with a quick release pin 32 for easy attachment and/or detachment of the rack frame 12. There is also shown a pair of mounting bolts 34, for securely attaching the frame attachment member 30 the underside, typically the belly pan (not shown), of a snowmobile (see FIGS. 1 and 2). The rack frame coupling 28 is attached to the rack frame 12 via the mounting plate 16. The mounting plate 16 is bolted to the rack frame 12 and rack frame coupling 28 with conventional bolts 22.

FIG. 3 additionally shows strap hooks 29, for securing the tie-down straps 26 to the cradles 18. Preferably, the tie-down straps have numerous notches for hooking (not shown) the straps to the cradles and to accommodate a wide variety of snowboard shapes and sizes.

VARIATIONS OF THE ILLUSTRATED EMBODIENT(S)

It is understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, in addition to the illustrated configuration, it is noted that the snowboard rack for snowmobiles may also be attached to a left side of a snowmobile. The frame attachment member, frame rack coupling, mounting plate, and frame rack may be installed on a left underside of the snowboard as well as a right side.

Similarly, variations in the size, and location of the frame attachment member in relation to the underside of a snowmobile are contemplated. For example, the frame attachment member may be attached at a more rearward position than was illustrated or at a more forward position in order to accommodate the particular needs of an operator.

One skilled in the art would recognize that any number of conventional fastener types or shapes would be appropriate to connect the rack frame to the mounting plate, to connect the mounting plate to the frame coupling, and to connect the frame attachment member to the underside, typically the belly pan, of a snowmobile. Similarly, the securing of the tie-down straps to the uprights 19 and cradle arms 20 may be achieved by any number of connection methods as recognized by one skilled in the art. For example, velcro, hook and loop, snap, and other mechanical connections are contemplated.

In addition, the relative length of the rack frame cross-member may be varied depending on the location and number of frame uprights. For example, three and four frame uprights, with corresponding cradles, are contemplated to accommodate longer or shorter snowboards. The height of the uprights and cradle arms may also be increased to accommodate especially wide snowboards.

Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

Although the illustrated embodiment has generally been discussed for use with snowboards, a skilled artisan of the water craft art will easily contemplate many other applications. For example, the present embodiment could easily be used for carrying skis and poles as well.

What is claimed is:

1. A snowboard rack for snowmobiles (10), comprising:

a) a rack frame (12), having at least two frame uprights (19) with bridging cross-members (13), which bridging cross-members (19) connect the frame uprights (19) together;

b) a snowboard cradle (18) mounted atop each frame upright (19);

c) a mounting plate (16), securely fastened to the rack frame (12) at a central base portion of the rack frame (12);

d) a frame coupling (28), securely fastened to an opposite face of the mounting plate (16) as the rack frame (12); and e) a frame attachment member (30), securely attachable to an underside of a snowmobile (14), which is removably attached to the frame coupling (28) with a quick release pin (32).

2. The snowboard rack for snowmobiles (10) of claim 1, wherein the snowboard cradles (18) include:

a) a cradle arm (20), integrally attached to the rack frame (12) at an adjacent and parallel position to the frame upright (19);

b) a tie-down strap (26), removably secured to the frame upright (19) on one side of the cradle (18), and to the cradle arm (20) on an opposite side of the cradle (18); and c) at least one pair of strap hooks (28), integrally attached to the cradle arm (20) and frame upright (19).

3. The snowboard rack for snowmobiles (10) of claim 1, wherein the quick release pin (32), connecting the frame coupling (28) to the frame attachment member (30) is a cotter pin.

4. The snowboard rack for snowmobiles (10) of claim 1, wherein the quick release pin (32), connecting the frame coupling (28) to the frame attachment member (30) is a threaded bolt and wing nut.

* * * * *